United States Patent [19]

Obara

[11] Patent Number: 5,967,671
[45] Date of Patent: Oct. 19, 1999

[54] BEARING STRUCTURE FOR MOTOR AND MOTOR WITH THE BEARING STRUCTURE

[75] Inventor: Rikuro Obara, Nagano-ken, Japan

[73] Assignee: Minebea Kabushiki-Kaisha, Nagano-ken, Japan

[21] Appl. No.: 09/023,296

[22] Filed: Feb. 13, 1998

[30] Foreign Application Priority Data

Feb. 14, 1997 [JP] Japan .................................. 9-047123

[51] Int. Cl.$^6$ ...................................................... F16C 33/60
[52] U.S. Cl. ........................................ 384/504; 29/898.07
[58] Field of Search ..................................... 384/504, 512, 384/513, 516, 537, 517; 29/898.07

[56] References Cited

U.S. PATENT DOCUMENTS

| | | | |
|---|---|---|---|
| 5,655,846 | 8/1997 | Obara | 384/504 X |
| 5,800,069 | 9/1998 | Obara | 384/504 |
| 5,808,388 | 9/1998 | Obara | 384/504 X |

FOREIGN PATENT DOCUMENTS 3 38112  4/1982  Germany ................... 384/517

*Primary Examiner*—Thomas R. Hannon
*Attorney, Agent, or Firm*—Lowe Hauptman Gopstein Gilman & Berner

[57] ABSTRACT

A double row bearing apparatus comprises a stepped shaft having larger and smaller diameter shaft portions, an inner race way groove provided on the outer peripheral surface of the larger diameter portion, balls interposed between the inner race way groove and an outer race way groove formed on an inner surface of an outer race surrounding the larger diameter portion, and a ball bearing including inner and outer races and balls interposed therebetween, wherein the ball bearing is fitted removably at its inner race over the smaller diameter portion of the stepped shaft.

6 Claims, 2 Drawing Sheets

BEARING STRUCTURE FOR MOTOR AND MOTOR WITH THE BEARING STRUCTURE

BACKGROUND OF THE INVENTION

1. Technical Field

The present Invention relates to an improvement of a double row bearing apparatus for Journalling rotational members of equipment such as motors including rotating portions.

2. Description of the Prior Art

In the prior art, there is a bearing apparatus for Journalling the rotational members of equipments such as motors or generators including rotating portion. The one of bearing apparatus Includes a pair of ball bearings 21, 22 assembled with a shaft 23, as shown in FIG. 3.

In this bearing, the ball bearings 21, 22 are spaced apart by means of spacer 24 secured in the shaft 23.

In the equipment such as a motor of a hard disk drive device to which a bearing apparatus Is to be Incorporated, it Is desirable to make It as compact as possible. In this connection, it is also desirable to reduce the size of the bearing apparatus Itself.

The way which can be adopted to reduce the size of the bearing apparatus Is to miniaturize both ball bearings of the pair. However, this countermeasure leads to the reduction of the diameter of the shaft.

The shaft of reduced diameter provides a problem of reduced rigidity thereof to impair the endurance of the device to which the bearing apparatus is to be incorporated. Further, the shaft of reduced diameter also reduces the rigidity thereof to reduce the resonance-proof property. In this connection, In case such bearing apparatus is to be employed in the precision rotating equipment such as the hard disk drive device, it becomes resonant with members of the equipment surrounding therearound e.g. the casing of the equipment. That is, the reduction of the resonanceproof property will be accompanied by the reduction of the reliability of the equipment.

Accordingly the object of the present Invention is to provide a compact enough double row bearing apparatus having a shaft of sufficient strength and rigidity.

SUMMARY OF THE INVENTION

These and other objects are achieved by a double row bearing apparatus comprising a stepped shaft having larger and smaller diameter shaft portions, an inner race way groove provided on the outer peripheral surface of the larger diameter portion, balls interposed between the inner race way groove and an outer race way groove formed on an inner surface of an outer race surrounding the larger diameter portion, and a ball bearing including inner and outer races and balls interposed therebetween, wherein the ball bearing is fitted removably at its inner race over the smaller diameter portion of the stepped shaft.

In the double row bearing apparatus according to the present invention, the outer diameter of the inner race of said ball bearing is same as that of the larger diameter portion of said stepped shaft, the inner diameter of the outer race of said ball bearing is same as that of the outer race provided around the larger diameter portion, and the diameter of the balls of said ball bearing is same as that of the balls interposed between the outer surface of the larger diameter portion and the outer race provided therearound.

BRIEF DESCRIPTION OF THE DRAWINGS

Further feature of the present invention will become apparent to those skilled in the art to which the present invention relates from reading the following specification with reference to the accompanying drawings, in which.

DETAILED DESCRIPTION OF THE PRESENT INVENTION

Figure 1:
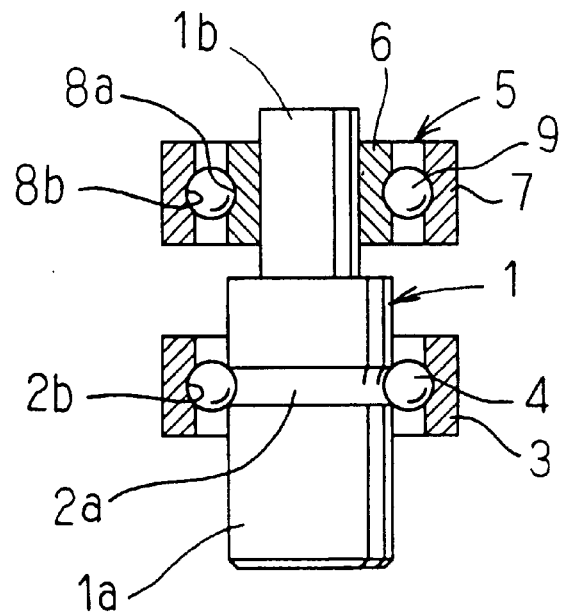
FIG. 1 is a longitudinal cross-sectional view of the double row bearing apparatus of the present invention.

A preferred embodiment of a double row bearing apparatus in accordance with the present invention will now be described in detail with reference to the attached drawings.

In the attached drawings, reference numeral 1 is added to a stepped shaft including a larger diameter shaft portion 1a around the outer peripheral surface thereof an inner race way groove 2a is provided, and smaller diameter shaft portion 1b.

Reference numeral 3 is added to an outer race provided around the larger diameter portion 1a. The outer race is formed on its inner peripheral surface with an outer race way groove 2b. A number of balls 4 are interposed between the inner and outer grooves 2a and 2b to provide one of the bearings of the double row bearing apparatus.

A ball bearing 5 is removably fitted with its inner race 6 on the smaller diameter portion 1b of the stepped shaft 1. The ball bearing 5 includes the inner race 6 having an inner race way groove 8a, an outer race 7 having an outer race way groove 8b, and a plurality of balls 9 interposed therebetween.

The outer diameter of inner race 6 of ball bearing 5 is made equal to the outer diameter of the larger diameter portion 1a of the stepped shaft 1. The inner and outer diameters of outer race 7 is same as those of outer race 3. In this connection, all of the balls 4 and 9 have the same diameter.

The usage of the double row bearing apparatus of the present invention of the structure as described above will be described with reference to FIG. 2, in which the bearing apparatus is incorporated in the motor of the hard disk drive device.

Figure 2:
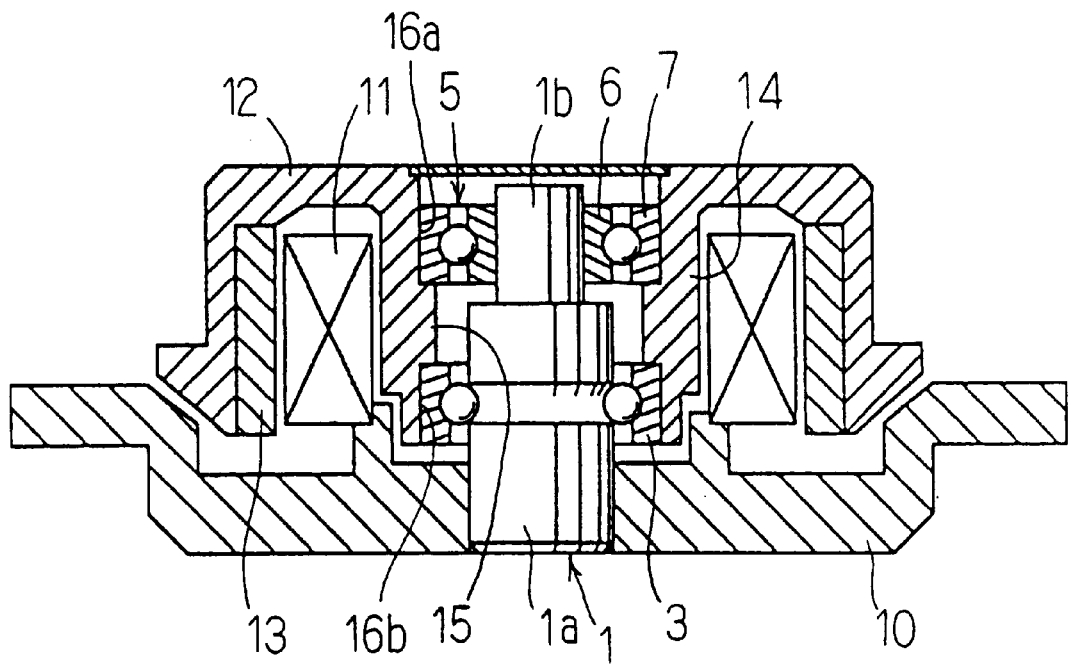
FIG. 2 is a longitudinal cross-sectional view of the double row bearing apparatus of the present invention incorporated into the motor for the hard disk drive device.
Figure 3:
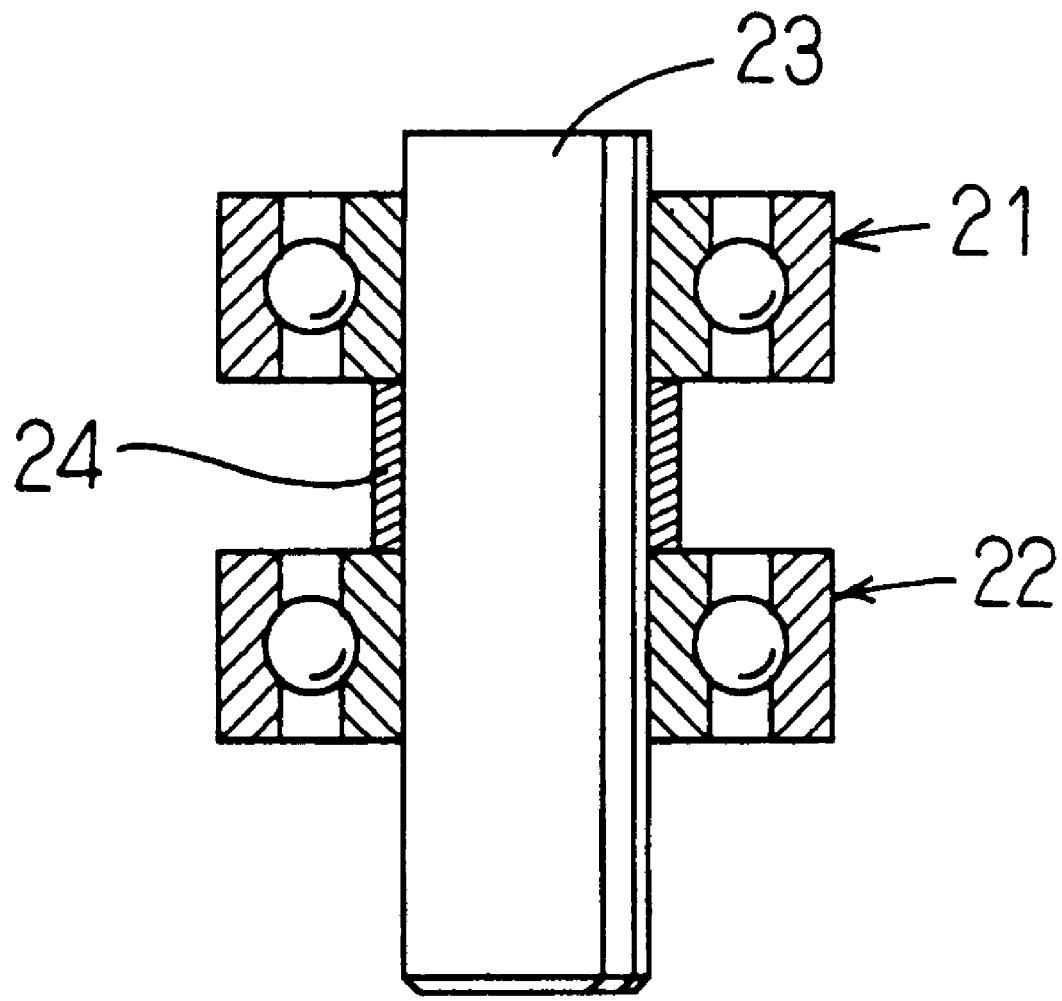
FIG. 3 is a longitudinal sectional view of the motor as the rotary machine in accordance with the prior art apparatus.

As can be seen in FIG. 2, each of reference numerals 10, 11, 12, and 13 are added to a base of the motor, a stator, a rotor as rotational member, and magnet means, respectively.

Installed and secured on the base 10 is the lower end of larger diameter portion 1a of stepped shaft 1 of the double row bearing apparatus of the present invention. The bearing apparatus is connected to the rotor 12 by securing a cylindrical sleeve 14 formed integrally with the rotor to the outer race 3 provided around the larger diameter portion of the shaft and outer race 7 of ball bearing 5.

The sleeve 14 is enlarged on both ends to form upwardly and downwardly opening upper and lower larger inner diameter portions 16a and 16b. These portions are same in their diameter and separated with each other by a thick smaller inner diameter portion 15 provided on the central portion of the sleeve. The outer race 7 of the ball bearing 5 is adapted to be fitted within upper portions 16a, and the outer race 3 is adapted to be fitted within the lower portions 16b. The thick portion 15 is adapted to be clamped between outer races 3 and 7 and secured therebetween.

In assembling the motor, a ball bearing 5 is removed from the double row bearing apparatus, then the lower end of larger diameter portion 1a of the stepped shaft is secured on the base, and fit the lower portion 16b of sleeve 14 of rotor 12 over the outer race 3 provided around the larger diameter portion.

Subsequently, the ball bearing 5 is fitted into the space formed between the top end of smaller diameter portion 1b and upper portion 16b of sleeve 14 to clamp thick portion 15 of sleeve 14 between outer races 7 and 3.

The inner race 6 of the ball bearing 5 is secured by any suitable means for example of adhesive to the smaller diameter portion 1b with applying proper pressure on the upper end surface of the inner race.

The double row bearing apparatus of the present invention can be employed in any sort of rotational portion of any kind of motors and generators, or rotating motion transmitting mechanism such as pulley as well as the motor of the hard disk drive device as stated above.

Although the balls 4 and 9 are same in their diameter in the above-mentioned embodiment, balls of different diameter can be used in some cases.

THE EFFECTS AND ADVANTAGES OF THE PRESENT INVENTION

The double row bearing apparatus in accordance with the the present invention having a construction as mentioned above will provide following effects.

The double row bearing apparatus of the present invention includes an inner race way groove formed directly on the outer peripheral surface of the larger diameter shaft portion. In this connection, the inner race to be provided in the prior art apparatus around the shaft is no longer necessary. Further, the diameter of the shaft portion on which the inner race is to be provided in the prior art thereon can be increased to make it possible to provide the stepped shaft. Consequently, the diameter of the outer race of the bearing can be decreased without decreasing the rigidity of the shaft.

In conclusion, the double row bearing apparatus can be miniaturize without sacrificing the strength or rigidity of the shaft, so that miniaturizing of the equipment to which the bearing apparatus of the present invention is incorporated can be effected.

Thus obtained rigidity of the shaft is sufficient to provide better resonance-proof property, and the resonance phenomena between the shaft any members therearound can be prevented. This leads to the improvement of the reliability of the equipment to which the bearing apparatus of the present invention is incorporated.

The ball bearing can be removed from the stepped shaft, so that any rotational member can be clamped between the outer race around the larger portion and the outer race of the ball bearing. In addition, assembling operation can be effected easily in any other equipment of complex structure.

Further, any design on the shape and the size can adopted on the portion of the shaft between the inner race way of the larger diameter portion and the ball bearing, since there are no spacer therebetween. Any other part or parts can be attached thereon.

Only one ball bearing of the prior art structure is required so that the inner race required for the present invention is also only one. This leads to the reduction of the number of parts of the apparatus.

While particular embodiment of the present invention have been illustrated and described, it should be obvious to those skilled in the art that various changes and modifications can be made without departing from the spirit and scope of the invention.

What is claimed is:

1. A bearing structure for a motor comprising a double row bearing apparatus, the double row bearing apparatus including; a stepped shaft having larger and smaller diameter shaft portions, an inner race way groove provided on the outer peripheral surface of the larger diameter shaft portion, balls interposed between the inner race way groove and an outer race way groove formed on an inner surface of an outer race surrounding the larger diameter shaft portion, and a ball bearing including inner and outer races and balls interposed therebetween, wherein the ball bearing is fitted at its inner race over the smaller diameter shaft portion of the stepped shaft, and the lower end of said larger diameter shaft portion of the double row bearing apparatus is installed and secured on a base;

said motor further comprising, a cylindrical sleeve provided through a rotor, said sleeve opening at both its upper and lower ends, wherein said sleeve is provided on its inner surface with upper and lower larger inner diameter portions of the same diameter and a thick smaller inner diameter portion formed therebetween, and said thick smaller inner diameter portion is clamped between the outer race provided around the larger diameter shaft portion and fitted within the lower portion of the sleeve and the outer race of the ball bearing fitted within the upper portion of the sleeve, thus the rotor is assembled stationary to the double row bearing apparatus.

2. The bearing structure according to claim 1, wherein the outer diameter of the inner race of said ball bearing is same as that of the larger diameter shaft portion of said stepped shaft, the inner diameter of the outer race of said ball bearing is same as that of the outer race provided around the larger diameter shaft portion, and the diameter of the balls of said ball bearing is same as that of the balls interposed between the outer surface of the larger diameter shaft portion and the outer race provided therearound.

3. A motor comprising a double row bearing apparatus, the apparatus including a stepped shaft having a larger diameter shaft portion and a smaller diameter shaft portion, an inner race way groove provided on the outer peripheral surface of the larger diameter shaft portion, balls interposed between the inner race way groove and an outer race way groove formed on an inner surface of an outer race surrounding the larger diameter shaft portion, and a ball bearing including an inner race, an outer race, and balls interposed between said inner race and said outer race; said motor further comprising, a base, a cylindrical sleeve provided through a rotor, said sleeve opening at both its upper and lower ends, wherein said sleeve having, on an inner surface thereof, upper and lower portions having a large inner diameter and an intermediate portion therebetween having a smaller inner diameter than said upper and lower portions, wherein the motor is assembled by the steps of:

securing a lower end of the larger diameter shaft portion of the stepped shaft on the base, fitting the lower larger inner diameter portion of the sleeve of the rotor over the outer race provided around the larger diameter shaft portion, fitting the ball bearing into a space formed between a top end of the smaller diameter shaft portion and the upper larger inner diameter portion of the sleeve to clamp the thick smaller inner diameter portion of the sleeve between the outer race provided around the larger diameter shaft portion and the outer race of the ball bearing, and securing the inner race of the ball bearing to the smaller diameter shaft portion with application of a pre-load on an upper end surface of the inner race.

4. The motor according to claim 3, wherein an outer diameter of the inner race of said ball bearing is same as the diameter of the larger diameter shaft portion of said stepped shaft, an inner diameter of the outer race of said ball bearing is same as an inner diameter of the outer race provided around the larger diameter shaft portion, and the diameter of the balls of said ball bearing is same as the diameter of the balls interposed between the outer surface of the larger diameter shaft portion and the outer race provided therearound.

5. The motor according to claim 3, wherein said cylindrical sleeve is formed integrally with said rotor and is integral therewith.

6. A method of assembling a motor comprising a double row bearing apparatus, the apparatus including a stepped shaft having a larger diameter shaft portion and a smaller diameter shaft portion, an inner race way groove provided on the outer peripheral surface of the larger diameter shaft portion, balls interposed between the inner race way groove and an outer race way groove formed on an inner surface of an outer race surrounding the larger diameter shaft portion, and a ball bearing including an inner race, an outer race, and balls interposed between said inner race and said outer race; said motor further comprising, a base, a cylindrical sleeve provided through a rotor, said sleeve opening at both its upper and lower ends, wherein said sleeve is provided on its inner surface with upper and lower portions having a large inner diameter and an intermediate portion therebetween having a smaller inner diameter than said upper and lower portions, the method comprising the steps of:

securing a lower end of the larger diameter shaft portion of the stepped shaft on the base, fitting the lower larger inner diameter portion of the sleeve of the rotor over the outer race provided around the larger diameter shaft portion, fitting the ball bearing into a space formed between a top end of the smaller diameter shaft portion and the upper larger inner diameter portion of the sleeve to clamp the thick smaller inner diameter portion of the sleeve between the outer race provided around the larger diameter shaft portion and the outer race of the ball bearing, and securing the inner race of the ball bearing to the smaller diameter shaft portion with application of a pre-load on an upper end surface of the inner race.

* * * * *